Oct. 1, 1940.   V. A. BRADFORD   2,216,407
UTENSIL SPOUT
Filed Aug. 1, 1939
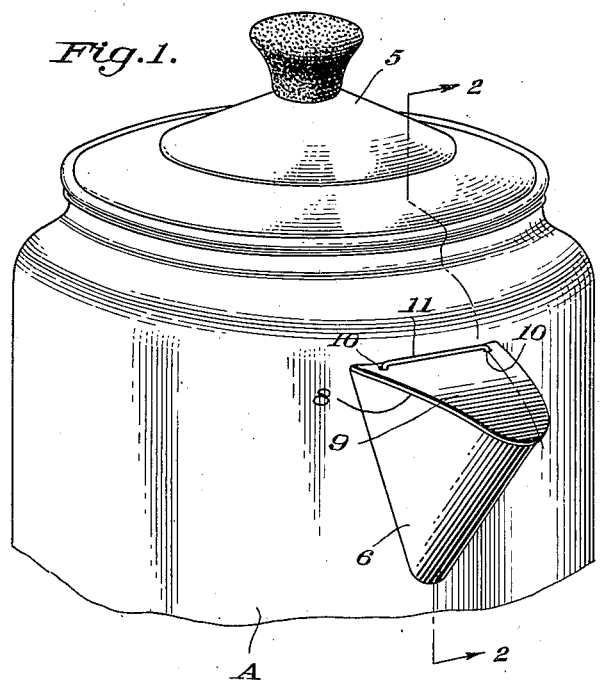
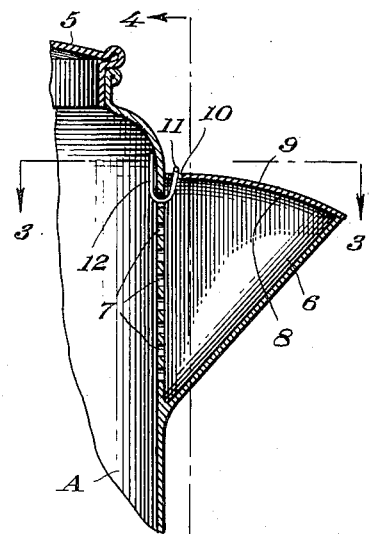
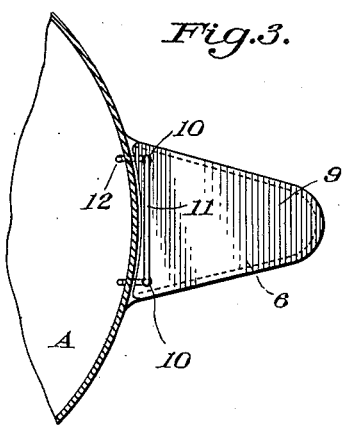
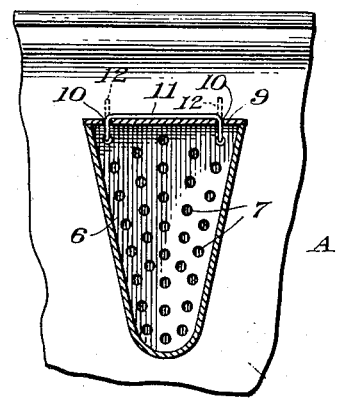
*Virgil A. Bradford:*
INVENTOR
BY *Victor J. Evans & Co.*
ATTORNEYS Patented Oct. 1, 1940

2,216,407

UNITED STATES PATENT OFFICE 2,216,407

UTENSIL SPOUT

Virgil A. Bradford, Columbus, Ohio

Application August 1, 1939, Serial No. 287,797

1 Claim. (Cl. 53—3)

This invention relates to a utensil spout and more especially to a pouring spout and a closure therefor to be used with cooking utensils or vessels.

The primary object of the invention is the provision of a spout of this character wherein the same when employed upon a coffee or tea pot will serve to retain heat therein and exclude cool air from entering through the spout, the latter being closed in a novel manner.

Another object of the invention is the provision of a spout of this character wherein the closure therefor is hinged for opening and closing movements in a novel manner so that it can be released when the occasion requires, particularly if the vessel and spout therefor require careful and thorough cleaning for sanitary purposes.

A further object of the invention is the provision of a spout of this character which is simple in its construction, thoroughly reliable and effective in its association with the closure therefor, strong, and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing:

Figure 1 is a perspective view of the coffeepot showing the spout and the closure therefor constructed in accordance with the invention in association with said pot;

Figure 2 is a sectional view taken on the line 2—2 of Figure 1 looking in the direction of the arrows;

Figure 3 is a fragmentary sectional view taken on the line 3—3 of Figure 2 looking in the direction of the arrows;

Figure 4 is a sectional view taken on the line 4—4 of Figure 2 looking in the direction of the arrows.

Similar reference characters indicate corresponding parts throughout the several views in the drawing.

Referring to the drawing in detail A designates generally a portion of the body of a vessel containing liquid, particularly the body of a coffee or tea pot, being closed at its open top by a removable lid or cover 5 as usual.

Formed with the body A is a pouring spout 6 and this body at the location of said spout is perforated at 7 to effect a strainer at the area where the interior of the body A and the said spout communicate with each other. The spout 6 at its uppermost portion has the edging thereof slightly upwardly arched as at 8 and contacting with this edge is a closure 9 preferably made from sheet metal and shaped correspondingly to the shape of the uppermost portion of the spout 6 being upwardly arched in conformity with the uppermost edging of the said spout to rest upon this edging and seal or close the spout from outside temperatures.

The closure 9 is vertically swingable for opening and closing thereof and engaged through spaced apertures 10 provided in said closure is a normally inverted substantially U-shaped hinging pintle 11 the closed end being in bridging relation to the closure 9 while the ends of this member 11 are hooked as at 12 through the perforations 7 creating a strainer between the body A and the spout 6 so that in this manner the closure 9 is hinged for vertical swinging movement and through gravity becomes seated upon the uppermost portion of the spout 6 for the closing thereof to retain heat within the body A and exclude cool air from without said body from passage through the spout 6 thereof.

The closure 9 is readily detached from the hooked engagement 12 with the body 8 as should be apparent from the disclosure in Figure 2 of the drawing.

What is claimed is:

A spout cover for a pot having its spout open throughout the top thereof, comprising a plate-like body shaped correspondingly to the open top of said spout and adapted for seating upon the edge of the latter at the open top, said body being formed with spaced apertures next to the innermost end thereof, and an inverted substantially U-shaped hinging pintle having the intermediate portion thereof bridging the body between the apertures and limbs of said pintle carried through the apertures and turned inwardly through the pot within said spout to the interior of the said pot and thence upwardly therein for separable pintle hinging of the body with relation to said spout.

VIRGIL A. BRADFORD.